(12) United States Patent
Cheng et al.

(10) Patent No.: US 8,416,866 B1
(45) Date of Patent: Apr. 9, 2013

(54) SYSTEM AND METHOD FOR REDUCING PHASE ERRORS IN MULTIPLE SUB-CARRIER COMMUNICATION SYSTEMS

(75) Inventors: Hao-Ren Cheng, Miaoli County (TW);
Kuang-Chung Ou, Kaohsiung (TW);
William J McFarland, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 678 days.

(21) Appl. No.: 12/512,273

(22) Filed: Jul. 30, 2009

(51) Int. Cl.
*H04K 1/10* (2006.01)

(52) U.S. Cl.
USPC .......................................... 375/260; 375/232

(58) Field of Classification Search .................. 370/208; 375/146, 229, 232, 260, 295, 346
See application file for complete search history.

(56) References Cited

U.S. PATENT DOCUMENTS

| | | | | |
|---|---|---|---|---|
| 8,000,417 B1 * | 8/2011 | Zhidkov et al. | ............... | 375/346 |
| 2004/0208232 A1 * | 10/2004 | Sudo | ............................ | 375/146 |
| 2008/0049598 A1 * | 2/2008 | Ma et al. | ....................... | 370/208 |
| 2008/0159423 A1 * | 7/2008 | Omoto et al. | ................ | 375/260 |
| 2009/0052561 A1 * | 2/2009 | Baxley et al. | ................ | 375/260 |

* cited by examiner

*Primary Examiner* — Leon-Viet Nguyen
(74) *Attorney, Agent, or Firm* — Bay Area Technology Law Group PC

(57) ABSTRACT

This disclosure is directed to systems and methods that compensate for a phase change that results from a change in RF gain, a "phase glitch," that would otherwise degrade the performance of a multiple sub-carrier communication system, such as OFDM. Pilot symbols are used to estimate the phase change, allowing the pilot and data symbols to be compensated by the estimated phase change. Preferably, the compensated pilots are used to per form a second iteration of phase change estimation that determines residual phase glitch. Thus, following the second estimation of phase change, data symbols can be compensated for the estimated residual phase change.

12 Claims, 2 Drawing Sheets

SYSTEM AND METHOD FOR REDUCING PHASE ERRORS IN MULTIPLE SUB-CARRIER COMMUNICATION SYSTEMS

FIELD OF THE PRESENT INVENTION

The present invention relates to interference reduction in digital communication systems in general and more specifically to techniques for reducing phase errors in mobile, wireless OFDM systems.

BACKGROUND OF THE INVENTION

Advanced multimedia services continue to drive requirements for increasing data rates and higher performance in wireless systems. Current technologies for high performance communication systems, such as those specified by the European terrestrial digital video broadcasting (DVB-T) standard and the Japanese integrated services digital broadcasting terrestrial standard (ISDB-T), employ communication methods based on Orthogonal Frequency Division Multiplexing (OFDM).

As known to those of skill in the art, multipath interference presents a significant impediment to effective wireless communication. Due to different length transmission routes, multiple versions of a transmitted data signal arrive at a receiver with different delays. These variable transmission times can result in inter-symbol interference (ISI) when the different data signals arrive at the receiver simultaneously.

In OFDM multiple sub-carrier systems, a higher rate data signal is divided among multiple narrowband sub-carriers that are orthogonal to one another in the frequency domain. Thus, the higher rate data signal is transmitted as a set of parallel lower rate data signals carried on separate sub-carriers.

A received OFDM symbol in an OFDM system generally consists of both data and pilot synchronization information transmitted on the multiple sub-carriers multiplexed together and spanning multiple sample periods. Modulation and demodulation in an OFDM system uses an inverse fast Fourier transform (IFFT) at the transmitter and a fast Fourier transform (FFT) at the receiver. At the transmitter, a cyclic prefix of a section of the IFFT output for each OFDM symbol is typically appended to the beginning of the OFDM symbol as a guard interval (GI). The length of the OFDM symbol before adding the guard interval is known as the useful symbol period duration. At the receiver, the cyclic prefix is removed prior to the FFT demodulation by the appropriate positioning of an FFT window, with size equal to the useful symbol period duration, along a received sample sequence. The FFT demodulation transforms the window of received time domain samples, in the received sample sequence, to a frequency domain (OFDM) symbol.

A principle advantage of this type of communication system is that the lower data rate occupies a longer symbol period than in a higher rate single carrier system. The addition of the guard interval to each lower frequency symbol contains the dispersion caused by multipath within the longer symbol period, reducing ISI. OFDM systems also offer a number of other advantages relevant to wireless applications, including high spectral efficiency and the ability to compensate for poor channel conditions, including signal fade.

A significant aspect of OFDM systems is the use of channel estimating techniques to correct for changes in the sub-carrier characteristics. In pilot-based systems, a known symbol, or "pilot," is transmitted at given sub-carrier frequencies and at given times. Since the receiver knows the transmitted symbol, any errors to the transmitted pilot due to sub-carrier conditions can be estimated and an appropriate correction calculated. Channel conditions for all sub-carriers and times can likewise be interpolated from the pilot information, allowing equalization of the signal and subsequent coherent demodulation.

Further details regarding the design of OFDM systems can be found in co-pending, commonly-assigned U.S. patent application Ser. Nos. 12/272,629, filed Nov. 17, 2008, 12/277,247, filed Nov. 24, 2008, 12/277,258, filed Nov. 24, 2008, 12/365,726, filed Feb. 4, 2009, and 12/398,952, filed Mar. 5, 2009, all of which are hereby incorporated by reference in their entirety.

Despite these benefits, a number of challenges related to OFDM system design remain, particularly for mobile, wireless applications. For example, phase noise resulting in modulation constellation rotation degrades the performance of an OFDM receiver. As will be appreciated, frequency mismatches between the transmitter and receiver can cause a loss of orthogonality between sub-carriers, resulting in inter-channel interference (ICI). These effects are magnified in the time-varying environment characteristic of mobile applications. For example, frequency shifts due to relative motion between the transmitter and receiver as a result of the Doppler effect create challenges in the design of an OFDM system for mobile applications.

Common phase error (CPE) is a manifestation of phase noise associated with maintaining frequency synchronization. While separate corrections to minimize ICI generally must be made for each sub-carrier, CPE is independent of the specific sub-carriers. A significant portion of CPE can be attributed to errors in the frequency oscillators, a problem that is exacerbated by attempts to reduce the cost of hardware, particularly in receivers. Fortunately, CPE largely can be compensated for by using differential detection techniques.

Another significant source of phase noise, herein termed "phase glitch," is a phase shift that occurs as a result of changes in radio frequency gain. Such changes are triggered in the receiver when the signal becomes stronger or weaker. These variations in signal strength can be triggered when a receiver is moving. In its path of motion, it may enter or leave areas in which the desired signal is shadowed. Alternatively, it may enter or leave areas in which multiple reflections of the signal add or subtract, causing signal fading that covers the entire bandwidth of the signal. To obtain good signal to noise ratio while avoiding distortion, it is normally necessary for the receiver to change the receive gain to compensate for such changes in signal amplitude. Depending on the design of the receiver, such changes in gain are often accompanied by changes in the delay or phase shift through the receiver. Thus, when the gain is changed to maintain proper signal sizing, an undesirable sudden shift in the phase of the received signal may result.

In some applications, the differential detection strategies used to combat CPE can successfully compensate for phase glitch. However, these conventional techniques for estimating phase glitch require continuous pilots, wherein a pilot is included with every OFDM symbol. Even if continuous pilots are available, differential detection is not suited for mobile environments because the phase change cannot be estimated effectively when the sub-carrier transfer function is time-varying. Thus, the phase change associated with Doppler shifts due to motion between the receiver and transmitter is too large to filter with these techniques.

Therefore, it would be desirable to provide OFDM systems that accurately estimate phase changes in a mobile environment. Likewise, it would be desirable to estimate phase changes without requiring continuous pilots. It would also be desirable to estimate phase changes despite a time-varying sub-carrier transfer function.

SUMMARY OF THE INVENTION

In accordance with the above needs and those that will be mentioned and will become apparent below, this disclosure is directed to a method for equalizing phase change in a multiple sub-carrier digital communication receiver comprising the steps of receiving a set of pilot symbols, estimating a phase glitch using the set of pilot symbols, and reducing phase error based upon the estimated first phase glitch from the set of pilot symbols to generate a set of compensated pilot symbols corresponding to the set of pilot symbols. Preferably, the method further comprises the step of estimating a residual phase glitch using the set of compensated pilot symbols. Also preferably, a first channel estimate is generated and the set of pilot symbols are equalized before estimating the first phase glitch. Phase error can then be removed from a plurality of data symbols based upon the estimated phase glitch.

In one embodiment, the method further comprises the step of generating a second channel estimate using the set of compensated pilots and equalizing the set of compensated pilot symbols before estimating the residual phase glitch. Preferably, phase error is reduced from the plurality of data symbols based on the residual phase glitch.

One aspect of these methods includes the steps of estimating the first and second phase glitches by applying a Wiener filter to the pilot symbols.

In a further aspect, inter-channel interference is reduced at one or more stages of the method. In one embodiment, inter-channel interference is reduced in the set of compensated pilot symbols. Preferably, inter-channel interference is also reduced in the plurality of data symbols based upon the first channel estimate and more preferably is reduced in the plurality of data symbols based upon the second channel estimate.

This disclosure is also directed to an apparatus in a multiple sub-carrier digital communication receiver for reducing phase noise, the apparatus comprising a first phase glitch block configured to estimate phase glitch using a set of received pilot symbols and a first equalization block configured to reduce phase error based on estimated phase glitch from the set of received pilot symbols and generate a set of compensated pilot symbols. Preferably, the apparatus further comprises a second phase glitch block configured to estimate residual phase glitch using the set of compensated pilot symbols. Further, the apparatus preferably comprises a first interpolation block configured to equalize the set of pilot symbols prior to being fed to the first phase glitch block. Also preferably, the first equalization block is configured to reduce phase error based upon the estimated phase glitch from a plurality of data symbols.

In one embodiment, the apparatus further comprises a second interpolation block configured to equalize the set of compensated pilot symbols prior to being fed to the second phase glitch block. Preferably, the apparatus further comprises a second equalization block configured to reduce phase error based upon the residual phase glitch from the plurality of data symbols.

Additionally, the apparatus is preferably is configured to reduce inter-channel interference. For example, the first equalization block can be configured to reduce inter-channel interference from the set of compensated pilot symbols. More preferably, the first equalization block is configured to reduce inter-channel interference from the plurality of data symbols and, even more preferably, the second equalization block is configured to reduce inter-channel interference from the plurality of data symbols based upon the second channel estimate.

BRIEF DESCRIPTION OF THE DRAWINGS

Further features and advantages will become apparent from the following and more particular description of the preferred embodiments of the invention, as illustrated in the accompanying thawing, and in which like referenced characters generally refer to the same parts or elements throughout the views, and in which.

DETAILED DESCRIPTION OF THE INVENTION

This disclosure is directed to systems and methods that compensate for a phase change that results from a change in RF gain, a "phase glitch," that would otherwise degrade the performance of a multiple sub-carrier communication system, such as OFDM. Pilot symbols are used to estimate the phase change, allowing the pilot and data symbols to be compensated by the estimated phase change. If desired, an additional iteration is performed, using the compensated pilots to estimate residual phase glitch. Following the second estimation of phase change, data symbols can be compensated for the estimated residual phase change to provide improved performance.

At the outset, it is to be understood that this disclosure is not limited to particularly exemplified materials, architectures, routines, methods or structures as such may, of course, vary. Thus, although a number of such option, similar or equivalent to those described herein, can be used in the practice of embodiments of this disclosure, the preferred materials and methods are described herein.

It is also to be understood that the terminology used herein is for the purpose of describing particular embodiments of this disclosure only and is not intended to be limiting.

Unless defined otherwise, all technical and scientific terms used herein have the same meaning as commonly understood by one having ordinary skill in the art to which the disclosure pertains.

Figure 1:
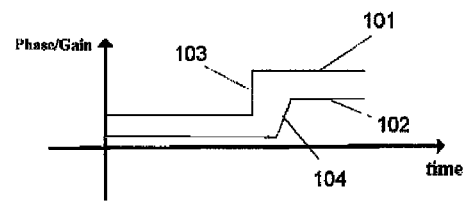
FIG. 1 schematically illustrates the phase change resulting from a change in RF gain.

As used herein, the term "phase change" and "phase glitch" refer to a phase shift caused by gain change in the received signal. FIG. 1 schematically depicts the phase change, wherein trace 101 corresponds to the RF gain and trace 102 corresponds to the phase, plotted against time. Accordingly, the change in RF gain designated by trace portion 103 results in a phase glitch as shown by trace portion 104.

Further, all publications, patents and patent applications cited herein, whether supra or infra, are hereby incorporated by reference in their entirety.

Finally, as used in this specification and the appended claims, the singular forms "a," "an" and "the" include plural referents unless the content clearly dictates otherwise.

Conventional techniques for compensating the phase change corresponding to changes in RF gain employ a differential detection method used to estimate CPE. Specifically, if $\phi_m$ is the CPE of a received OFDM symbol at time m, then:

$$Y_{k,m} = X_{k,m} \cdot H_{k,m} \cdot e^{j(\phi_m)} + N_{k,m} \quad (1)$$

$$Z_{k,m} = Y_{k,m} \cdot Y^*_{k,m-1} \quad (2)$$

$$= X_{k,m} \cdot X^*_{k,m-1} \cdot H_{k,m} \cdot H^*_{k,m-1} \cdot e^{j(\phi_m - \phi_{m-1})} \quad (3)$$

$$= |X_k|^2 \cdot |H_{k,m}|^2 \cdot e^{j(\phi_m - \phi_{m-1})}, \quad (4)$$

where $Y_{k,m}$ is the received OFDM symbol at frequency k and time m, $X_{k,m}$ is the transmitted OFDM symbol at frequency k and time m and $H_{k,m}$ is the sub-carrier transfer function at frequency k and time m. This equation requires that $X_{k,m}$ are continuous pilots and that the transfer function is relatively static, so that $H_{k,m} \approx H_{k,m-1}$.

Figure 2:
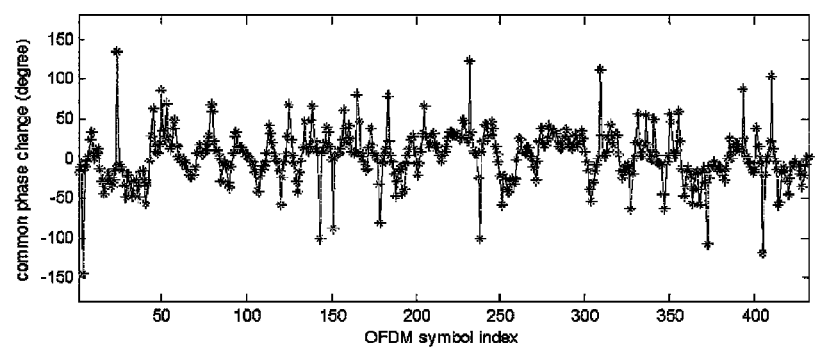
FIG. 2 is a graph showing the phase change between adjacent OFDM symbols.
Figure 3:
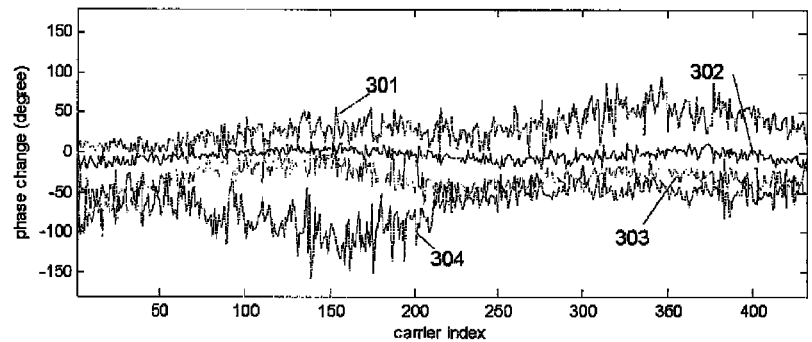
FIG. 3 is a graph showing the phase change at each sub-carrier.

As discussed above, this differential detection method requires continuous pilots, rendering it unsuitable for use in systems employing scattered pilots, such as the DVB-T (Digital Video Broadcasting-Terrestrial) and ISDB-T (Integrated Services Digital Broadcasting-Terrestrial) standards. Similarly, this method also fails to estimate phase change effectively in mobile environments when $H_{k,m}$ is time-varying. For example, FIGS. 2 and 3 illustrate the phase change due to Doppler shift in a simulated mobile environment using the typical urban 6 model (TU-6), using MODE 3, OFDM symbol duration 1.26 milliseconds, a guard interval of ¼ and having a Doppler frequency of 100 Hz. The 432 sub-carriers are assumed to be continuous pilots. FIG. 2 graphs the phase change between neighboring OFDM symbols as calculated using Eq. (4). FIG. 3 illustrates the phase change for four continuous OFDM symbols, designated by trace 301 for OFDM symbol n, trace 302 for OFDM symbol n+1, trace 303 for OFDM symbol n+2 and trace 304 for OFDM symbol n+3, at each sub-carrier frequency.

As can be seen in FIGS. 2 and 3, the phase glitch resulting from motion between the transmitter and receiver causes large phase shifts. In general, CPE differential detection methods fail at phase errors of approximately 40 degrees or greater. Thus, the phase changes experienced due to relative motion between the receiver and transmitter are too large to filter effectively using the conventional methods described above.

Accordingly, the techniques described in this disclosure are configured to compensate for the phase errors due to Doppler effects in a mobile environment. First, equalized pilots are used to estimate the phase glitch and generate compensated pilots. Next, residual phase glitch is estimated using from the compensated pilots and corrected. These techniques mitigate the performance loss due to phase glitch.

The formulation for estimating phase glitch is as follows:

$$Y_{k,m} = X_{k,m} \cdot H_{k,m} \cdot e^{j(\phi_m)} + N_{k,m} \quad (5)$$

$$H'_{k,m} = \frac{Y_{k,m}}{X_{k,m}} = H_{k,m} \cdot e^{j(\phi_m)} + N_{k,m}, \quad (6)$$

$$\hat{X}_{k,m} = \frac{Y_{k,m}}{\hat{H}_{k,m}}, \quad (7)$$

where $H_{k,m}$ represents a complex valued channel response that modifies a complex valued transmit symbol $X_{k,m}$ on sub-carrier k and $N_{k,m}$ represents the additive interference (noise) on sub-carrier k, at frequency k and time m. A Wiener filter is used to smooth the Doppler effect and it is assumed that the phase change occurs once during the interval from m−M$_0$ to m+M$_1$ as follows:

$$\hat{H}_{k,m} = \sum_{m'=m-M_0}^{m+M_1} W_{k,m'} \cdot H'_{k,m'} \quad (8)$$

$$\approx H_{k,m} \cdot e^{j(\phi'_m)}, \text{ where } \phi'_m < \phi_m \quad (9)$$

$$\therefore \hat{X}_{k,m} = X_{k,m} \cdot e^{j(\phi_m - \phi'_m)}. \quad (10)$$

Thus, the estimated phase glitch can be derived from Eq. (10) as $\phi_m - \phi'_m$.

Figure 4:
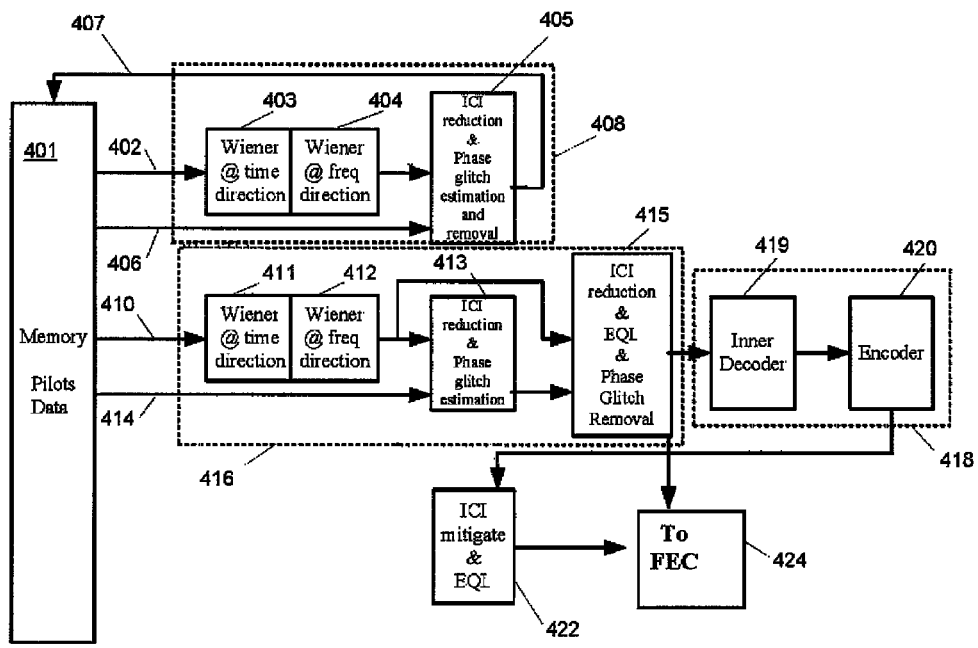
FIG. 4 is a schematic illustration of the functional blocks of an apparatus for reducing phase noise from a multiple carrier wireless communication system, according to the invention.

Preferably, the phase glitch removal processes described above are implemented as part of an overall channel estimation system. To that end, FIG. 4 schematically illustrates the functional blocks of a multiple sub-carrier communication system receiver employing a representative channel estimation process configured to reduce ICI, in which the phase glitch removal process has been integrated. Further details regarding ICI reduction techniques can be found in co-pending, commonly-assigned U.S. patent application Ser. No. 12/398,952, filed Mar. 5, 2009, which was incorporated by reference above.

As shown, memory block 401 is used to store received pilot symbols and data symbols as well as pilot and data symbols that have been equalized to reduce ICI and phase glitch. An initial stream 402 of pilot symbols is interpolated by time and frequency by Wiener filters in blocks 403 and 404, respectively, to estimate channel conditions for each sub-carrier. The equalized pilot symbols are then fed to first estimation block 405, where a first phase glitch estimation is performed as discussed above and subtracted from the pilot symbols. In this embodiment, estimation block 405 also reduces ICI based on information obtained from the pilot symbols. Accordingly, pilot and data symbol stream 406 which is subsequently fed to estimation block 405 can be equalized based upon the first phase glitch estimation and to reduce ICI. Data symbols and pilot symbols are returned to memory block 401 in stream 407 for subsequent estimation and equalization.

In the embodiment shown, it should be recognized that phase glitch estimation and ICI reduction requires an iteration of pilot symbols to be fed through estimation block 405. Thus, pilot symbols (in stream 402) corresponding to time m are used to provide the channel estimation that is used for subsequently received pilot and data symbols (in stream 406), such as those at time m−3.

As shown, interpolation blocks 403 and 404 and estimation block 405 form a functional group 408 responsible for a first estimation procedure that provides a first iteration of phase glitch removal.

Next, pilot symbols from memory block 401 that have been ICI reduced and subjected to a first round of phase glitch removal are fed in stream 410 to time and frequency interpolation by Wiener filters in blocks 411 and 412, respectively. This interpolation procedure provides a more refined estimation of channel conditions. The pilot symbols, after the second iteration of interpolation, are then fed to second estimation block 413, where a second phase glitch estimation is performed to estimate residual phase glitch. Preferably, a further iteration of ICI reduction is performed as well. Then, the pilot and data symbol stream 414 is subsequently fed through estimation block 413 to equalization block 415 for removal of the residual phase glitch, based on estimation block 413, and additional ICI removal. In a similar manner to that discussed above, the pilot and data symbols in stream 414 represent subsequently received information, such as at time m−5, after the second iteration of phase glitch estimation. As discussed above, an alternative embodiment utilizes only a single round of phase glitch estimation.

As shown, interpolation blocks 411 and 412, estimation block 413 and equalization block 415 form functional group 416 responsible for the second estimation procedure that provides the second iteration of phase glitch removal.

Depending upon the application of the channel estimation process, the equalized data symbols can be fed to additional processing stages. For example, the data symbols can be fed to a Decision Feedback Equalization (DFE) module 418 to obtain corrected transmit data to aid ICI reduction. DFE module 418 generally comprises inner decoder block 419, employing a technique such as Viterbi decoding, and encoder block 420. Preferably, DFE is employed when allowed by the desired application, such as the handheld Digital Video Broadcast (DVB-H) standard. Following the DEE process, an additional iteration of ICI removal and equalization can be performed in block 422

Output from block 422 or, in applications where DFE overhead is not desirable or allowed, such as ISDB-T, data symbols equalized in block 415, are fed to forward error correction (FEC) block 424, before being passed onto subsequent demodulation and signal processing. As one of skill in the art will recognize, the channel estimation and equalization routines can be implemented using appropriate minimum mean square error (MMSE) and zero-forcing (ZF) techniques.

The benefits of employing the phase glitch reduction processes herein disclosed include improved signal-to-noise ratios and the ability to compensate for relatively large phase shifts. As such, the tolerance of an OFDM, or other multiple sub-carrier communication system, can be improved to accommodate the Doppler effects experienced in mobile applications. A simulation of phase glitch toleration was performed using a 64 quadrature amplitude modulation (64QAM) system, using a ⅔ code rate, I=1, a useful signal time of 100 μs and 0 dB. The pedestrian B model (PedB) was used which simulates a pedestrian moving at 3 km/h. Table 1 the data obtained for carrier noise (CN) at bit error rates (BER)=2×10$^{-4}$ after Viterbi detection at a variety of phase errors. As can be seen, Table 1 details the performance of phase glitch compensation with three different receiver systems: R1, no compensation, R2, a single estimation of phase glitch, compensated at the final equalizer output and R3, two iterations of phase glitch estimation, for example as shown above with regard to FIG. 4. The automatic gain control of the system updates the gain after every 16 OFDM symbols, approximately every 20 ms. For this test, a phase glitch was added after every 16 OFDM symbols, with a uniform distribution from −CPE to +CPE. The numbers in parentheses represent the signal degradation due to phase glitch.

TABLE 1

GLITCH NOISE TOLERATION

| CPE | R1 | R2 | R3 |
|---|---|---|---|
| 0 degree | 18.9 dB | 18.9 dB | 18.9 dB |
| 10 degree | 19.3 dB (−0.4) | 18.9 dB (−0) | 18.9 dB (−0) |
| 20 degree | 20.3 dB (−1.4) | 19.1 dB (−0.2) | 18.9 dB (−0) |
| 40 degree | Fail | 20.0 dB (−1.1) | 19.4 dB (−0.5) |
| 60 degree | Fail | Fail | 20.3 (−1.4) |
| 80 degree | Fail | Fail | Fail |

The packet error rate was checked after Reed Solomon decoding and was equal to zero except for the fail cases. As can be seen, phase glitch estimation and correction provided reduced signal degradation at all non-zero CPE, unless the phase change was so large (80 degree) it caused a fail condition in each receiver. Further, improved performance was seen at each valid instance going from a single estimation to two iterations, including the ability to achieve valid results when a lesser degree of correction or no correction resulted in a fail condition. Thus, depending upon the application, an implementation using a single iteration of phase glitch estimation can be employed where reduced complexity or more rapid results are desired while still providing improved performance with respect to conventional phase error estimation methods. One of skill in the art will appreciate that all the phase glitch estimation techniques disclosed herein provide a significant improvement in a multiple-carrier communication system.

It should be noted that the exemplary embodiments shown above contain a number of computational blocks that may be shared or distributed depending upon the desired implementation. For example, the number of memory blocks distributed throughout a design may differ and additional memory blocks can be used. Similarly calculation blocks, such as the interpolation filters or the equalizers can be shared or distributed as desired. Also one or more phase change estimation or ICI reduction blocks may be configured to perform the iterative calculations sequentially. A variety of similar implementations should be considered equivalent to the phase glitch reducing systems described above.

Described herein are presently preferred embodiments, however, one skilled in the art that pertains to the present invention will understand that the principles of this disclosure can be extended easily with appropriate modifications to other applications. For example, examples have been given regarding use with the mobile television standards ISDB-T and DVB-H, although the principles can be applied to a wide range of OFDM wireless communication standards, including other mobile television standards, including T-DMB, CMMB(STiMi) and MediaFLO forward link, as well as other digital television standards, including DVB-T, digital radio standards, including DAB/EUREKA 147, DAB+, Digital Radio Mondiale, HD Radio, T-DMB and ISDB-TSB, wireless LAN radio interfaces, including IEEE 802.11a, g, n and HIPERLAN/2, cellular communication systems, including Flash-OFDM, mobile and wireless broadband systems, including HSOPA, BWA, WiMAX, Mobile WiMax, and WiBro, and other wideband systems, including UWB. Furthermore, the phase glitch estimation and removal can be applied to other multiple sub-carrier wireless systems, including CDMA, GSM, IS-856, EV-DO, SDMA and the like. As such, changes and modifications are properly, equitably, and intended to be, within the full range of equivalence of the following claims.

What is claimed is:

1. A method for equalizing phase change in a multiple sub-carrier digital communication receiver comprising the steps of:

receiving a set of pilot symbols;

generating a first channel estimate and equalizing the set of pilot symbols;

estimating a first phase glitch using the equalized set of pilot symbols;

reducing phase error based upon the estimated first phase glitch from the set of pilot symbols and a plurality of data symbols to generate a set of compensated pilot symbols corresponding to the set of pilot symbols;

estimating a residual phase glitch using the set of compensated pilot symbols; and generating a second channel estimate using the set of compensated pilots and equalizing the set of compensated pilot symbols before estimating the residual phase glitch.

2. The method of claim 1, further comprising the step of reducing phase error based upon the residual phase glitch from the plurality of data symbols.

3. The method of claim 1, wherein the steps of estimating the first phase glitch and the residual phase glitch comprise applying a Wiener filter to the pilot symbols.

4. The method of claim 1, further comprising the step of reducing inter-channel interference from the set of compensated pilot symbols.

5. The method of claim 1, further comprising the step of reducing inter-channel interference from the plurality of data symbols based upon the first channel estimate.

6. The method of claim 2, further comprising the step of reducing inter-channel interference from the plurality of data symbols based upon the second channel estimate.

7. The method of claim 1, wherein the pilot symbols comprise scattered pilot symbols.

8. An apparatus in a multiple sub-carrier digital communication receiver for reducing phase noise, the apparatus comprising:

a first interpolation block configured to equalize a set of pilot symbols:

a first phase glitch block configured to estimate phase glitch using the equalized set of received pilot symbols;

a first equalization block configured to reduce phase error based on estimated phase glitch from the set of received pilot symbols and a plurality of data symbols and generate a set of compensated pilot symbols;

a second phase glitch block configured to estimate residual phase glitch using the set of compensated pilot symbols; and a second interpolation block configured to equalize the set of compensated pilot symbols prior to being fed to the second phase glitch block.

9. The apparatus of claim 8, further comprising a second equalization block configured to reduce phase error based upon the residual phase glitch from the plurality of data symbols.

10. The apparatus of claim 8, wherein the first and second phase glitch estimation blocks are configured to apply a Wiener filter to the pilot symbols.

11. The apparatus of claim 8, wherein the first equalization block is configured to reduce inter-channel interference from the set of compensated pilot symbols and the plurality of data symbols.

12. The apparatus of claim 9, wherein the second equalization block is configured to reduce inter-channel interference from the plurality of data symbols based upon the second channel estimate.

* * * * *